United States Patent [19]

Chesler

[11] Patent Number: 5,079,697
[45] Date of Patent: Jan. 7, 1992

[54] DISTORTION REDUCTION IN PROJECTION IMAGING BY MANIPULATION OF FOURIER TRANSFORM OF PROJECTION SAMPLE

[75] Inventor: David A. Chesler, Newton Highlands, Mass.

[73] Assignee: The General Hospital Corporation, Boston, Mass.

[21] Appl. No.: 662,313

[22] Filed: Feb. 21, 1991

Related U.S. Application Data

[63] Continuation of Ser. No. 346,316, May 1, 1989, abandoned, which is a continuation of Ser. No. 924,285, Oct. 29, 1986, abandoned.

[51] Int. Cl.$^5$ ............................................. G06F 15/42
[52] U.S. Cl. .................................................. 364/413.2
[58] Field of Search .................... 364/413.13, 413.14, 364/413.15, 413.16, 413.17, 413.18, 413.19, 413.2

[56] References Cited

U.S. PATENT DOCUMENTS

| | | | |
|---|---|---|---|
| 4,205,375 | 5/1980 | Inouye et al. | 364/413.2 |
| 4,282,438 | 8/1981 | Nishida et al. | 378/11 |
| 4,326,252 | 4/1982 | Kohns et al. | 364/413.21 |
| 4,549,265 | 10/1985 | Deckers et al. | 364/413.16 |
| 4,555,760 | 11/1985 | Op de Beek et al. | 364/413.19 |
| 4,616,318 | 10/1986 | Crawford | 364/413.2 |

OTHER PUBLICATIONS

Inouye, "Analysis of Artifact Pattern Generation in Two Dimensional Fourier Transform Image Reconstruction Algorithm for Computerized Tomography," *Proceedings of the 1984 International Symposium on Noise and Clutter Rejection in Radars and Imaging Sensors*, pp. 170–175.

Orphanoudakis et al., "Linearizing Mechanisms in Conventional Tomographic Imagery," *Medical Physics*, vol. 5, No. 1, Jan./Feb. 1978, pp. 1–7.

Mersereau, "Direct Fourier Transform Techniques in 3-D Image Reconstruction," *Computers in Biology and Medicine*, vol. 6, No. 4, Oct., 1976, pp. 247–258.

Niki et al., "A High-Speed Computerized Tomography Image Reconstruction Using Direct Two-Dimensional Fourier Transformer Method," *Systems Computers Controls-scripta electronic japonica III*, vol. 14, May–Jun. 1983, 56–65.

Stark et al., "An Investigation of Computerized Tomography by Direct Fourier Inversion and Optimum Interpolation", IEEE Transactions on Biomedical Engineering, vol. BME-28, No. 5, May, 1981, 496–505.

Stark et al., "Direct Fourier Reconstruction in Computer Tomography" *IEEE Transactions on Acoustics, Speech and Signal Processing*, vol. ASSP-29, No. 1, Feb. 1981, 237–245.

Stark et al., "Experimental Investigation of Computerized Tomography by Direct fourier Inversion", IEEE 1981 Frontiers of *Engineering in Health Care*, Sep. 19–21, 1981, 89–96.

Stark et al., "Fourier Transform Reconstruction in CAT by Exact Interpolation", *IEEE 1979 Frontiers of Engineering in Health Care*, Oct. 6–7, 1979.

Brooks et al., "Theory of Image Reconstruction in Computed Tomography", Radiology, vol. 117, No. 3, Dec., 1975.

Llacer et al., "Matrix Based Image Reconstruction Methods for Tomography", IEEE Transactions on Nuclear Science, vol. NS-32, No. 1.

Orphanoudaki et al., "A Fourier Domain Mathematical Representation of Conventional Tomographic Imaging Techniques", *Proceedings of the Fourth New England Bioengineering Conference*, 1976, 399–402.

Stark et al., "Image Reconstruction in Computer-Aided Tomography by Direct Fourier Methods", IEEE 1980 *Frontiers of Engineering in Health Care*, Sep. 1980.

Fan et al., "Comments on 'Direct Fourier Reconstruction in Computer Tomography'", *IEEE Transactions on Acoustics, Speech and Signal Processing*, vol. ASSP-33, No. 2, Apr., 1985, 446–449.

Soumekh et al., "Fourier Domain Reconstruction Methods with Application to Diffraction Tomography", *Acoustical Imaging*, vol. 13, Plenum Press: New York, 1984, 17–30.

Buonocore et al., "A New Decomposition for 2-Dimensional Image Reconstruction", *Medical Physics*, vol. 7, No. 4, Jul./Aug., 1980, 427.

*Primary Examiner*—Clark A. Jablon

*Attorney, Agent, or Firm*—Fish & Richardson

[57] ABSTRACT

Distortion is reduced in images derived by Fourier transform methods from projection samples by manipulating the Fourier transformed values by a predetermined procedure of a kind that subjects the image values to unwanted distortion, and then applying to the projection samples or image values a correction function that corresponds to the predefined procedure.

33 Claims, 3 Drawing Sheets

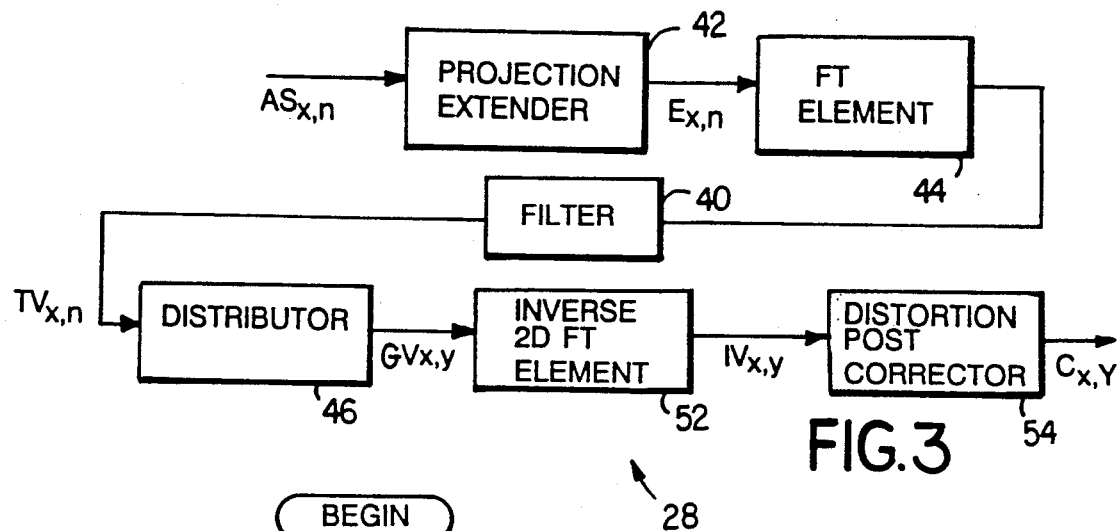
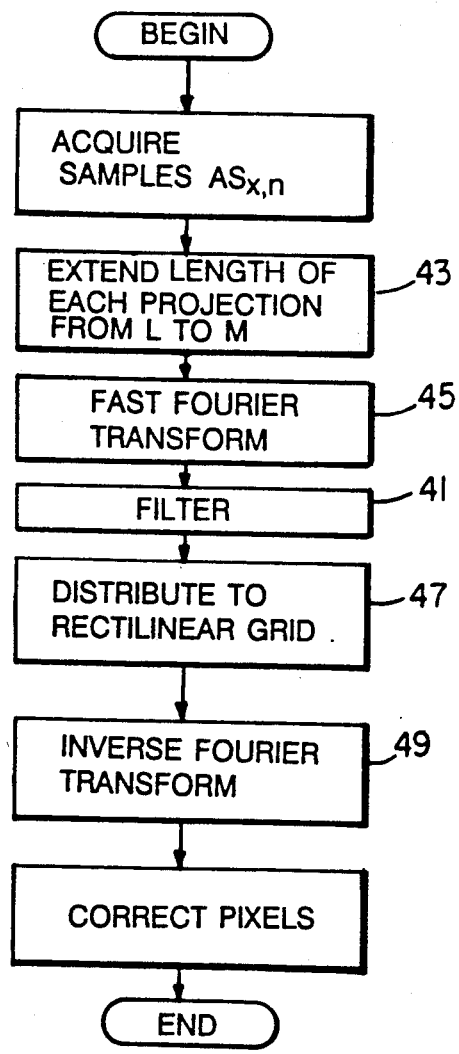
FIG.3
FIG.4

DISTORTION REDUCTION IN PROJECTION IMAGING BY MANIPULATION OF FOURIER TRANSFORM OF PROJECTION SAMPLE

This is a continuation of copending application Ser. No. 07/346,316 filed on May 1, 1989 abandoned, which is a continuation of Ser. No. 06/924,285 filed on Oct. 29, 1986, abandoned.

BACKGROUND OF THE INVENTION

This invention relates to projection imaging.

In such imaging, each raw data sample may (e.g., in the case of X-ray imaging) represent the attenuation of a beam projected through an object along one of many paths within a plane of interest. In other imaging schemes (e.g., positron emission), the data samples are derived from emissions originating at various locations within the object. In either case the data samples (which can generally be called projection samples) typically are mathematically processed by convolutional back projection to reconstruct a two-dimensional tomographic image of the plane of interest. Three-dimensional images can also be formed by back projection, but require a larger number of calculations.

In a second reconstruction technique, needing fewer calculations, a matrix of the projection samples is transformed from the real space domain to the frequency domain by Fourier transformation. The resulting Fourier transform values may be viewed as lying at specific locations on a complex plane. The Fourier transform values are used in an interpolation process that generates a corresponding set of values located at the intersection points of a rectilinear grid. An inverse Fourier transform then reconverts the grid values to a matrix of pixel values representing the desired image. Depending on the interpolation technique used, the image may exhibit distortion.

SUMMARY OF THE INVENTION

One general aspect of the invention is in (1) manipulating Fourier transform values (derived from projection samples) in accordance with a predefined procedure of a kind that distorts the image values, and then (2) reducing the distortion by applying to the projection samples or image values a correction function that corresponds to the predefined procedure. As a result, the predefined procedure can be a relatively simple (and hence fast) one while producing a good image.

Preferred embodiments of the invention include the following features.

In some embodiments, the Fourier transform values are distributed over a grid, and the correction function is applied to the image values. Each image value is multiplied by a correction (weighting) factor that is a function of the distance of the image value from an origin of the image. In some cases, the predefined distribution procedure assigns each Fourier transform value to the nearest grid point. In other cases, the assignment is to the Q nearest grid points which define the space (e.g., square or cube) in which the transform value lies (i.e., $Q = 2^D$, where D is the number of dimensions in the image). The correction functions are then respectively either $$\frac{1}{\frac{\sin(x/G)}{x/G} \cdot \frac{\sin(y/G)}{y/G} \cdot \frac{\sin(z/G_z)}{z/G_z}}$$

or that expression squared, where x, y, z, represent components of the distance of the image value from the origin of the image, G represents the size of the grid in the x and y directions, and $G_z$ represents the size of the grid in the z direction. The image is either two-dimensional or three-dimensional.

In other embodiments, the number of Fourier transform values is increased and their spacing decreased by interpolation in the Fourier transform domain, and a correction function corresponding to the interpolation technique is applied to the original projection samples. As a result, the distortion of the final image is reduced. Each projection sample is divided by a correction factor that depends on the distance of the projection sample from an origin of the object. In some cases each interpolated value is the same as the nearest original Fourier transform value and the correction function is of the type, $$\left(\frac{\sin(x/M)}{x/M} \cdot \frac{\sin(z/M_z)}{z/M_z}\right)$$

where M relates to the number of projection samples along an x axis and $M_z$ to the number of projection samples along a z axis. In other cases, each interpolated value is based on the nearest Q Fourier transform values which define the space in which the interpolated value lies and the correction function is of the type $$\left(\frac{\sin(x/M)}{x/M} \cdot \frac{\sin(z/M_z)}{z/M_z}\right)^2.$$

Other advantages and features will become apparent from the following description of the preferred embodiment, and from the claims.

DESCRIPTION OF THE PREFERRED EMBODIMENT

We first briefly describe the drawings.

FIGS. 3, 4 are block and flow diagrams, respectively, of an imaging system and method.

STRUCTURE AND OPERATION

Figure 1:
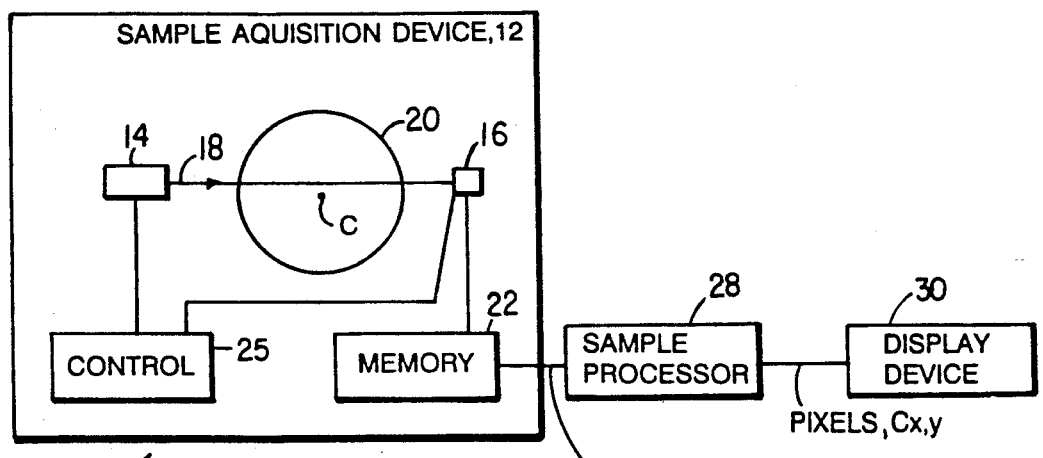
FIG. 1 is a block diagram of a projection imaging system.

Referring to FIG. 1, a projection imaging system 10 includes a conventional sample acquisition device 12 having, for example, an X-ray beam source 14 and a corresponding X-ray detector 16 positioned to receive and measure the strength of an X-ray beam 18 that has been attenuated by passage through an object 20 in the plane of the paper. A value corresponding to the attenuated X-ray beam strength is stored digitally in a memory 22. (In this example the final image is two dimensional but as will be explained below the invention is especially useful in systems, e.g., positron emission tomography systems, for generating three-dimensional images.)

Figure 2:
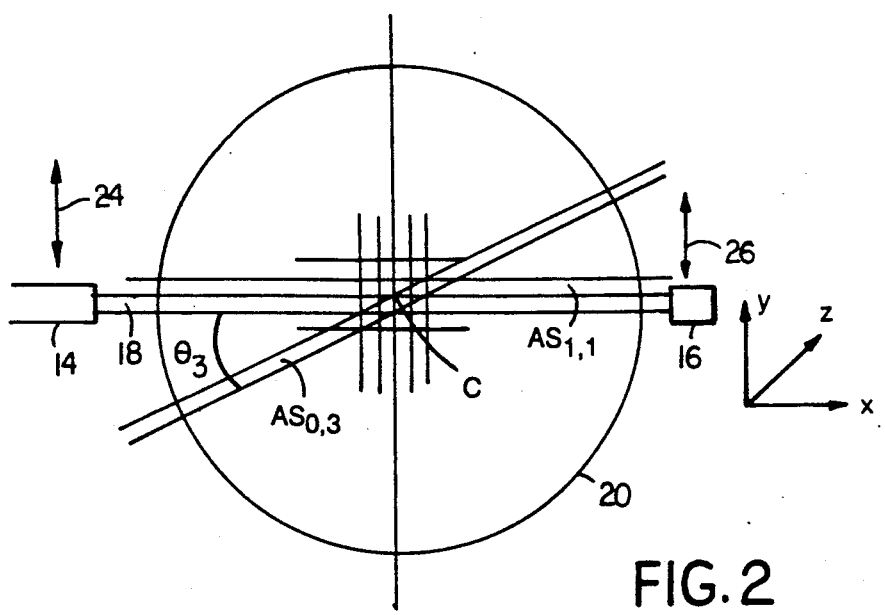
FIG. 2 is a diagram of beam paths through an object.

Referring also to FIG. 2, source 14 and detector 16 can together be moved laterally (as indicated by arrows 24, 26) as dictated by control 25 in order to acquire a series of attenuation samples for a series of parallel X-ray beam paths (each of finite width) located at a succession of y-axis positions. The attenuation samples of such a series are together called a projection. A set of such projections are acquired at different angles ($\theta$) about a center point C by rotation of both source 14 and detector 16 about C (also dictated by control 25).

The resulting set of projections are organized as an attenuation sample matrix that is stored in memory 22 in the following form:

| Sample Position (x) |
| --- |
| $-\left(\frac{L}{2}-1\right)\ldots-2,-1,0,1,2\ldots\frac{L}{2}$ |
| $\theta_1$ |
| Angle (n) $\theta_2$ $\ldots AS_{-1,2}\ldots$ |
| . |
| . |
| $\theta_N$ |

The matrix has N rows each corresponding to one projection at a particular angular position $\theta$, and L columns each corresponding to a particular lateral position (relative to center C) within that projection. The sample that corresponds to C is at x location 0. Each attenuation sample is denoted $AS_{x,n}$ where $n=1,\ldots,N$ denotes the row and $$x = -\left(\frac{L}{2}-1\right),\ldots 0,\ldots \frac{L}{2}$$

denotes the column. Only one exemplary sample ($AS_{1,2}$) is shown in the matrix. Thus, the attenuated samples of the matrix correspond to different beam paths through body 20, all beam paths being in one plane. Two examples ($AS_{1,1}$ and $AS_{0,3}$) are identified in FIG. 2.

Referring again to FIG. 1, a two-dimensional image of the plane of object 20 is reconstructed from the attenuated samples by a sample processor 28 (e.g., a programmed digital computer). The picture elements (pixels) generated by processor 28 are converted to an image by a conventional display device 30.

Referring to FIGS. 3, 4, in sample processor 28, the attenuation samples are passed to a projection extender 42. Each projection originally has a length L (i.e., L samples). Projection extender 42 extends (block 43, FIG. 4) each projection to a length M (where M is a power of 2 that is larger than L) by inserting additional zero-valued samples at each end of the projection. Generally, the larger the number M, the better the final image, but the more time required for Processing.

For example, if L is 54, each projection is extended to, for example, length M=64 by adding zero-valued samples on each end of the projection. The resulting samples of each projection are denoted $E_{x,n}$ where $$E_{x,n} = AS_{x,n}, \text{ for all } n, \text{ and for } -\left(\frac{L}{2}-1\right) \leq x \leq \frac{L}{2}$$

$$E_{x,n} = 0, \text{ for all } n, \text{ and for } x > \frac{L}{2} \text{ and } x < -\left(\frac{L}{2}-1\right).$$

Thus the expanded projection samples lie in a matrix of the following form (in which only one exemplary sample—$E_{x,n}$—is shown):

| Sample Position (x) | | | |
| --- | --- | --- | --- |
| $-\left(\frac{M}{2}-1\right)\ldots\frac{-L}{2}\ldots-2,-1,0,1,2\ldots\frac{L}{2}\ldots\frac{M}{2}$ | | | |
| $\theta_1$ | 0...0 | | 0...0 |
| Angle (n) $\theta_2$ | 0...0 | | 0...0 |
| . | | $\ldots E_{x,n}\ldots$ | |
| $\theta_N$ | 0...0 | | 0...0 |

Each row of the matrix of expanded samples is passed to a one-dimensional fast Fourier transform element 44, which generates (block 45, FIG. 4) as its output the following matrix of Fourier transformed complex values $TV_{x,n}$:

| Complex Transform Values (x) |
| --- |
| $-\left(\frac{M}{2}-1\right)\ldots-2,-1,0,1,2\ldots\frac{M}{2}$ |
| $\theta_1$ |
| $\theta_2$ |
| Angle (n) . $\ldots TV_{x,n}\ldots$ |
| . |
| $\theta_N$ |

Each row of the matrix represents a radial line in a two-dimensional Fourier transform plane of an image of the plane of body 20. The angular orientation of the nth radial line in the Fourier transform plane is $\theta_n$. There are M successive transform values $TV_{1,n}\ldots TV_{M,n}$ (each complex) equally spaced along the radial line and extending in both directions from the origin of the complex plane.

The values $TV_{x,n}$ are next passed through a filter 40 to filter the values (block 41, FIG. 4) to compensate for the variation in their density. The filtering is by simple multiplication and the filter is the same as the one used in the back projection reconstruction method.

Figure 5:
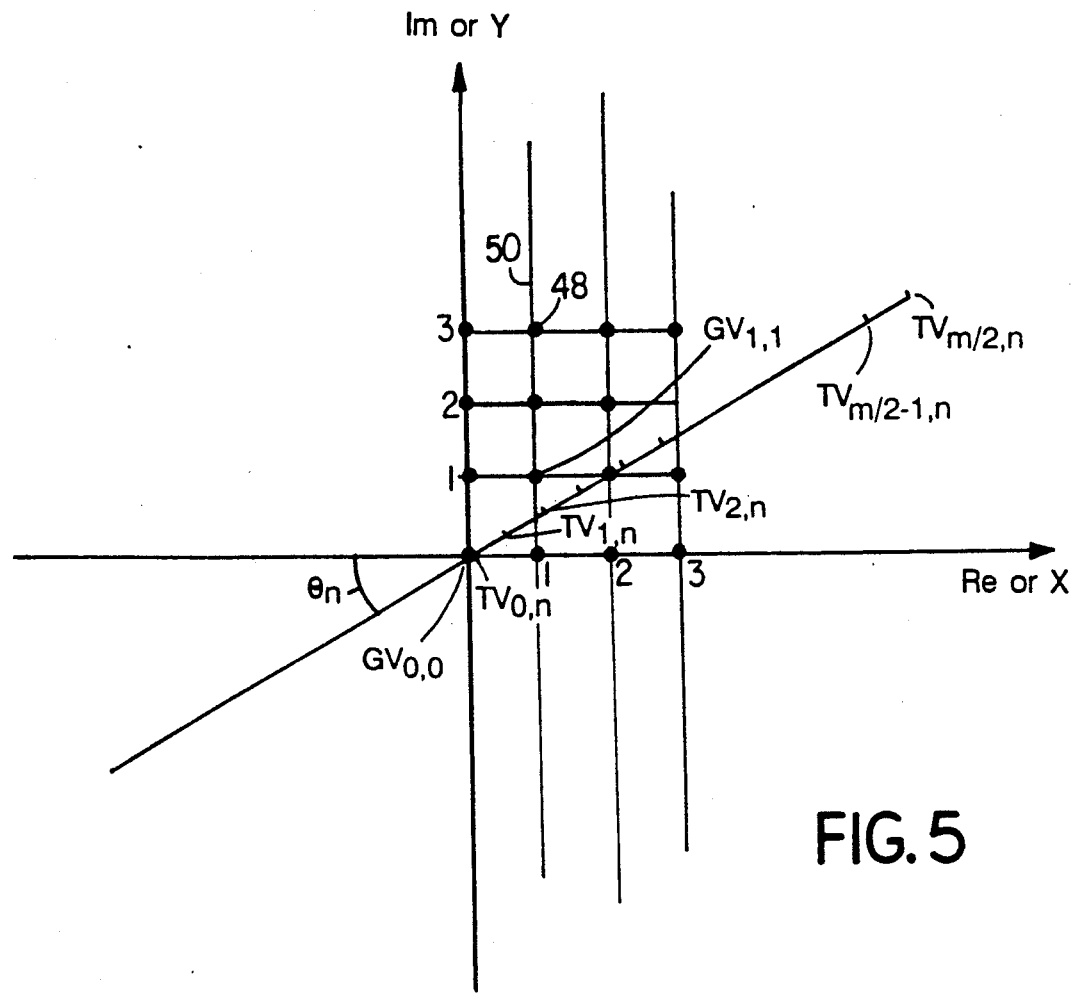
FIG. 5 is a diagram of the distribution of transform values to a grid.

Referring also to FIG. 5, the filtered complex Fourier transform values $TV_{x,n}$ of each line are next passed to a distributor 46 which distributes (block 47, FIG. 4) each transform value to the points 48 of a two-dimensional rectilinear grid 50. The distribution is performed by a simple process in which each value $TV_{x,n}$ is assigned (with a weight of unity) to the nearest (in the sense of Euclidean distance) grid value, denoted $GV_{x,y}$ where x and y are the coordinates of the grid point at which the value lies. Thus, for example, in FIG. 5 $TV_{0,n}$ and $TV_{1,n}$ are both assigned to $GV_{0,0}$ while $TV_{2,n}$ is assigned to $GV_{1,1}$. The value at any grid point is the sum of the values assigned to it.

The two-dimensional matrix GV is of size $G\times G$ where G is the smallest number that is both a power of 2 and is larger than L. Note that G could be the same as M or smaller than M. For example, for L=54, we could have M=128 and G=64.

Referring again to FIGS. 3, 4, the matrix GV is next passed to an inverse Fourier transform element 52 that recovers (block 49, FIG. 4) a matrix of image pixel values, denoted $IV_{x,y}$, (where x and y are now the coordinates of the image plane) which are in turn passed to a distortion post corrector 4. In corrector 54, the values are multiplied by factors determined by a correction function in order to derive final corrected values $C_{x,y}$, as follows:

$$C_{x,y} = IV_{x,y}\left(\frac{1}{\frac{\sin(x/G)}{x/G}\cdot\frac{\sin(y/G)}{y/G}}\right)$$

where, in the parenthetical expression, x and y represent distances (in numbers of samples) from the origin C. The values $C_{x,y}$ are the final pixel values delivered to the display device 30 (FIG. 1).

Thus, although only a simple technique is used to distribute the Fourier transformed values to a rectilinear grid, the resulting image distortions are corrected by a simple weighting function applied after the inverse Fourier transform is done.

The process of extending each projection by adding zeroes to the ends produces, in the Fourier transformation, a greater number of Fourier transform values that are more closely spaced along each radial line. The effect of this is to reduce image distortion (e.g., streak-type artifacts) that would otherwise result from the process of distributing the Fourier transform values to the grid.

Other functions can be used to distribute the TV values to the GV matrix. A second such function, although more complex, is in some ways preferred to the previously described technique, which requires a greater expansion of the original projections to achieve an equally good final image. The second function distributes each TV value to the four nearest GV values lying on the square which contains the TV value, in each case with a weighting that decreases linearly with distance between the TV value and the GV point. That is, the weighting factor is $(1-x/c)(1-y/c)$ where x and y are the distances along the x and y axes in the transform space, respectively, and c is the distance between grid lines in the rectilinear grid. In general, the distortion post corrector is arranged to apply a correcting function that corresponds to the particular distributor function being used. In the example immediately above, the post correction function would be $$\left(\frac{1}{\frac{\sin(x/G)}{x/G}\cdot\frac{\sin(y/G)}{y/G}}\right)^2$$

By using Fourier transform rather than back projection the computational load is reduced, making the invention especially useful for three-dimensional imaging. Such three-dimensional images can be generated (using, e.g., positron emission imaging) by an analogous procedure in which a three-dimensional lattice of original attenuation samples is subjected to a two-dimensional Fourier tranform. After filtering, each value of each resulting Fourier transform plane distributed to the nearest Q=8 vertices of a three-dimensional lattice (analogous to the grid) which define the cube in which the value lies ($Q=2^D$ where D is the number of dimensions in the image, in this case three). The distribution is done by a weighting function $(1-x/c)(1-y/c)(1-z/c)$. An inverse three-dimensional Fourier transform then results in a reconstructed three-dimensional set of volume elements (voxels) for display. The post correction function would then be $$\left(\frac{1}{\frac{\sin(y/G)}{x/G}\cdot\frac{1}{\frac{\sin(y/G)}{y/G}}\cdot\frac{1}{\frac{\sin(z/G_z)}{z/G_z}}}\right)^2$$

where $G_z$ (which may differ from G) is the size of the lattice in the z dimension (normal to x and y).

Figure 6:
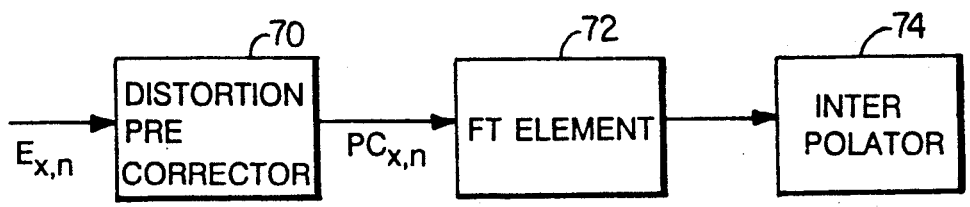
FIGS. 6, 7 are block and flow diagrams, respectively, of a precorrection technique.
Figure 7:
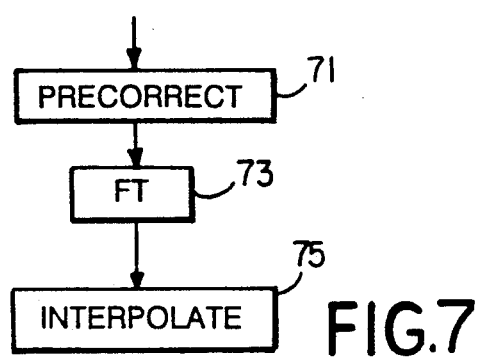

Referring to FIGS. 6, 7, as another technique for increasing the number (and reducing the frequency spacing) of the Fourier transform values, the projections may, as before, be expanded to M, a power of 2 and greater than L. (The purpose of this expansion among other things is to provide a number of samples that is appropriate to the needs of conventional Fourier transform algorithms.) Each sample is then passed to a distortion precorrector 70 where it is precorrected (block 71, FIG. 7) in the image domain to compensate for an interpolation that will be done directly in the Fourier transform domain. The precorrection is done by dividing each sample by a weighting factor $((\sin(x/M))/(x/M))^2$ in the case of a two-dimensional image, where x is the number of the sample, and sample $x\times 0$ views the center of rotation c). That is, each precorrected sample —$PC_{x,n}$— is calculated as $$PC_{x,n}=E_{x,n}/(\sin(x/M)/(x/M))^2$$

Figure 8:
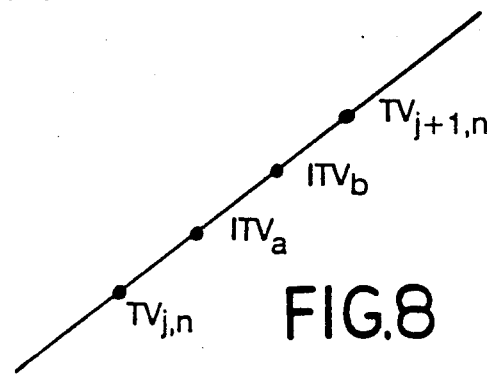
FIG. 8 is a diagram illustrating interpolation of transform values.

After Fourier transformation 72, 73, additional samples are linearly interpolated 75 (by interpolator 74, FIG. 6) along the radial line between each pair of TV values. Alternatively, the nearest TV value can simply be repeated in which case the precorrection factor is (for the two-dimensional case) $\sin(x/M)/(x/M)$. Referring to FIG. 8, in the first technique, interpolated transform values $ITV_a$ and $ITV_b$ would be linear interpolations of $TV_{j,n}$ and $TV_{j+1,n}$. Under the second technique, $ITV_a$ and $ITV_b$ would be set equal respectively to $TV_{j,n}$ and $TV_{n+1,n}$. If the interpolation were done without the precorrection, the amplitude of the resulting image would fall off with distance from the center.

For the three dimensional case the precorrection factor is either sin $$\frac{\sin(x/M)}{(x/M)}\cdot\frac{\sin(z/M_z)}{(z/M_z)}$$

or that expression squared where $M_z$ is the expanded number of projection samples in the z-axis direction.

In the processing of transform values, even after the filtering, there will be some variation of density of TV values over the plane, as a result of the process of distributing Fourier transform values to grid points. To correct for this variation, each time a filtered TV value is added to a GV value, a quantity $W\cdot f$ is also added to the corresponding element of a separate real matrix D (of the same dimensions as the GV matrix), where f is the magnitude of the filter used on the TV values (w/o the Hanning weighting). For example, in the two-dimensional case, f is the distance of the TV value from the center C. W is the weighting used in the distribution of TV values to grid points. After all TV values have been distributed, each element of the GV matrix is divided by the corresponding element of the D matrix. If an element of D is zero the corresponding element in the corrected GV matrix is set to zero. As a result, the noise-like artifacts in the image which are produced by density variations are reduced.

Other embodiments are within the following claims.

The invention can be used with any type of imaging system in which the image is reconstructed from projection samples, each of which represents information about a plurality of locations in an object, e.g., emission tomography and some forms of nuclear magnetic resonance.

The complex conjugate symmetry in the Fourier domain (due to pure real data and filters) can be exploited to reduce the Fourier domain operations by a factor of two.

I claim:

1. An imaging system of the kind in which an image of an object is reconstructed from projection samples by (a) transforming said samples to Fourier transform values, (b) deriving a grid of values from said Fourier transform values, and (c) inverse transforming said grid to obtain image values each having a distance from an origin of said image, the system comprising means for distributing said Fourier transform values to said grid of values in accordance with a predefined procedure which subjects said image values to distortion, and means for reducing said distortion by applying to said image values, a correction function that defines, for each of said image values, a weighting factor which is a function of a distance of said image value from an origin of said image.

2. The imaging system of claim 1 wherein said means for distributing comprises means for assigning each of said Fourier transform values to at least one of the nearest points on said grid.

3. The imaging system of claim 2 wherein said means for distributing comprises means for assigning each of said Fourier transform values to a single point which is nearest point on said grid to said Fourier transform value.

4. The imaging system of claim 3 wherein said correction function is of the type $$\frac{1}{\frac{\sin(x/G)}{x/G} \frac{\sin(y/G)}{y/G} \frac{\sin(z/G_z)}{z/G_z}}$$

where x, y, z represent the components of distance of the location of an image value that corresponds to said Fourier transform value from an origin of said image, G represents the total number of points of the grid in the x and y directions, and $G_z$ represents the total number of points of the grid in the z direction.

5. The imaging system of claim 2 wherein said means for distributing comprises means for assigning each of said Fourier transform values to Q points on said grid that are nearest to said Fourier transform value and define the space within which said Fourier transform value lies ($Q=2^D$ where D is the number of dimensions of said image).

6. The imaging system of claim 2 or 5 wherein said correction function is of the type $$\left(\frac{1}{\frac{\sin(x/G)}{x/G} \frac{\sin(y/G)}{y/G} \frac{\sin(z/G_z)}{z/G_z}}\right)^2$$

where x, y, z represent the components of distance of the location of an image value that corresponds to said Fourier transform value from an origin of said image, G represents the total number of points of the grid in the x and y directions, and $G_z$ represents the total number of points of the grid in the z direction.

7. An imaging system of the kind in which an image of an object is reconstructed from projection samples by (a) transforming said samples to Fourier transform values, (b) deriving a grid of values from said Fourier transform values, and (c) inverse transforming said grid to obtain image values each having a distance from an origin of said image, the system comprising means for increasing the number and reducing the spacing of said Fourier transform values in the Fourier transform domain, means for distributing said Fourier transform values to said grid of values in accordance with a predefined procedure which subjects said image values to distortion, and means for reducing said distortion by applying to said projection samples, a correction function that defines, for each of said projection samples, a weighting factor which is a function of a distance of said projection samples from a sample that corresponds to an origin of said object.

8. The system of claim 7 further comprising means for reducing said distortion by applying to said image values, correction function that defines, for each of said image values, a weighting factor which is a function of a distance of the location of said image value from an origin of said image.

9. The imaging system of claim 8 wherein said predefined procedure equates each interpolated value to a single Fourier transform value that is nearest to said interpolated value.

10. The imaging system of claim 9 wherein said means for reducing comprises means for dividing each said projection sample by said weighting factor.

11. The imaging system of claim 7 or 9 wherein said correction function is of the type $$\frac{\sin(x/M)}{x/M} \frac{\sin(z/M_z)}{z/M_z}$$

where x and z represent distances of a given projection sample from an origin of said object, M corresponds to a number of projection samples in the x direction, and $M_z$ corresponds to a number of projection samples in the z direction.

12. The imaging system of claim 7 wherein said predefined procedure equates each interpolated value based on a plurality, Q, of Fourier transform values that are nearest to said interpolated value and define the space within which said interpolated value lies ($Q=2^{D-1}$ where D is the number of dimensions of said image).

13. The imaging system of claim 7 or 12 wherein said correction function is of the type $$\left( \frac{\sin (x/M)}{x/M} \frac{\sin (z/M_z)}{z/M_z} \right)^2$$

where x and z represent distances of a given projection sample from an origin of said object, M corresponds to a number of projection samples in the x direction, and $M_z$ corresponds to a number of projection samples in the z direction.

14. An imaging system of the kind in which an image of an object is reconstructed from projection samples by (a) transforming said samples to Fourier transform values, (b) deriving a grid of values from said Fourier transform values, and (c) inverse transforming said grid to obtain image values, the system comprising means for distributing said Fourier transform values to said grid of values in accordance with a predefined procedure which subjects said image values to distortion, said predefined procedure distributing each of said Fourier transform values without regard to the distribution of any other said transform value, and means for reducing said distortion by applying to said image values, a correction function that corresponds to said predefined procedure.

15. An imaging system of the kind in which an image of an object is reconstructed from projection samples by (a) transforming said samples to Fourier transform values (b) deriving a grid of values from said Fourier transform values, and (c) inverse transforming said grid to obtain image values, the system comprising means for distributing said Fourier transform values to said grid of value sin accordance with a predefined procedure which subjects said image values to distortion, said predefined procedure distributing each of said Fourier transform values based on relative distances of said transform value to at least one of the nearest points of said grid, and means for reducing said distortion by applying to said image values, a correction function that corresponds to said predefined procedure.

16. The imaging system of claim 1, 7, 14, or 15 wherein said image is two-dimensional.

17. The imaging system of claim 1, 7, 14, or 15 wherein said image is three-dimensional.

18. An imaging method of the kind in which an image of an object is reconstructed from projection samples by (a) transforming said samples to Fourier transform values, (b) deriving a grid of values from said filtered Fourier transform values, and (c) inverse transforming said grid to obtain image values each having a distance from an origin of said image, the method comprising distributing said Fourier transform values to said grid of values in accordance with a predefined procedure which subjects said image values to distortion, and reducing said distortion by applying to said image values, a correction function that defines, for each of said image values, a weighting factor which is a function of a distance of said image value from an origin of said image.

19. The method of claim 18 wherein said distributing comprises assigning each of said Fourier transform values to at least one of the nearest points on said grid.

20. The method of claim 19 wherein said distributing comprises assigning each of said Fourier transform values to a single point which is the nearest point on said grid to said Fourier transform value.

21. The method of claim 20 wherein said correction function is one of the type $$\frac{1}{\frac{\sin (x/G)}{x/G} \frac{\sin (y/G)}{y/G} \frac{\sin (z/G_z)}{z/G_z}}$$

where x, y, z represent the components of distance of the location of an image value that corresponds to said Fourier transform value from an origin of said image, G represents the total number of points of the grid in the x and y directions, and $G_z$ represents the total number of points of the grid in the z direction.

22. The method of claim 19 wherein said distributing comprises assigning each of said Fourier transform values to Q points on said grid that are nearest to said Fourier transform value and define the space within which said Fourier transform value lies ($Q=2^D$ where D is the number of dimensions of said image).

23. The method of claim 19 or 22 wherein said correction function is of the type $$\left( \frac{1}{\frac{\sin (x/G)}{x/G} \frac{\sin (y/G)}{y/G} \frac{\sin (z/G_z)}{z/G_z}} \right)^2$$

$$\left( \frac{1}{\frac{\sin (x/G)}{x/G} \frac{\sin (y/G)}{y/G} \frac{\sin (z/G_z)}{z/G_z}} \right)^2$$

where x, y, z represent the components of distance of the location of an image value that corresponds to said Fourier transform value from an origin of said image, G represents the total number of points of the grid in the x and y directions, and $G_z$ represents the total number of points of the grid in the z direction.

24. An imaging method of the kind in which an image of an object is reconstructed from projection samples by (a) transforming said samples to Fourier transform values, (b) deriving a grid of values from said Fourier transform values, and (c) inverse transforming said grid to obtain image values each having a distance from an origin of said image, the method comprising increasing the number and reducing the spacing of said Fourier transform values in the Fourier transform domain, distributing said Fourier transform values to said grid of values in accordance with a predefined procedure which subjects said image values to distortion, and reducing said distortion by applying to said projection samples, a correction function that defines, for each of said projection samples, a weighting factor which is a function of a distance of said projection sample from a sample that correspond to an origin of said object.

25. The method of claim 24 wherein said predefined procedure equates each interpolated value to a single Fourier transform value that is nearest to said interpolated value.

26. The method of claim 24 or 25 wherein said correction function is of the type $$\frac{\sin(x/M)}{x/M} \frac{\sin(z/M_z)}{z/+M_z}$$

where x and z represent distances of a give projection sample from an origin of said object, M corresponds to a number of projection samples in the x direction, and $M_z$ corresponds to a number of projection samples in the z direction.

27. The method of claim 24 wherein said predefined procedure equates each interpolated value based on a plurality, Q, of Fourier transform values that are nearest to said interpolated value and define the space within which said interpolated value lies ($Q=2^{D-1}$ where D is the number of dimensions of said image).

28. The method of claim 24 or 27 wherein said correction function is of the type $$\left( \frac{\sin(x/M)}{x/M} \frac{\sin(z/M_z)}{z/M_z} \right)^2$$

$$\left( \frac{\sin(x/M)}{x/M} \frac{\sin(z/M_z)}{z/M_z} \right)^2$$

where x and z represent distances of a given projection sample from an origin of said object, M corresponds to a number of projection samples in the x direction, and $M_z$ corresponds to a number of projection samples in the z direction.

29. The method of claim 24 wherein said reducing comprises dividing each said projection sample by said weighting factor.

30. An imaging method of the kind in which an image of an object is reconstructed from projection samples by (a) transforming said samples to Fourier transform values, (b) deriving a grid of values from said filtered Fourier transform values, and (c) inverse transforming said grid to obtain image values each having a distance from an origin of said image, the method comprising distributing said Fourier transform values to said grid of values in accordance with a predefined procedure which subjects said image values to distortion, said predefined procedure distributing each of said Fourier transform values based on relative distances of said transform value to points of said grid, reducing said distortion by applying to said image values, a correction function that corresponds to said predefined procedure.

31. An imaging method of the kind in which an image of an object is reconstructed from projection samples by (a) transforming said samples to Fourier transform values, (b) deriving a grid of values from said filtered Fourier transform values, and (c) inverse transforming said grid to obtain image values each having a distance from an origin of said image, the method comprising distributing said Fourier transform values to said grid of values in accordance with a predefined procedure which subjects said image values to distortion, said predefined procedure distributing each of said Fourier transform values to at least one of the nearest points of said grid without regard to the distribution of any other transform point, reducing said distortion by applying to said image values, a correction function that corresponds to said predefined procedure.

32. The imaging method of claim 18, 24, 30, or 31 wherein said image is two-dimensional.

33. The imaging method of claim 17, 23, 30, or 31 wherein said image is three-dimensional.

* * * * *

UNITED STATES PATENT AND TRADEMARK OFFICE
CERTIFICATE OF CORRECTION

PATENT NO. : 5,079,697

DATED : January 7, 1992

INVENTOR(S) : David A. Chesler

It is certified that error appears in the above-identified patent and that said Letters Patent is hereby corrected as shown below:

Title Page:
In the "ABSTRACT", page 2, line 5, change "predetermined" to --predefined--;

Column 5, line 12, "corrector 4." should be --corrector 54.--;

Columm 6, line 3, after "plane", insert --is--;

Column 8, claim 7, line 36, "samples" should be --sample--;

Column 8, claim 8, line 40, insert "a" before "correction function";

Column 10, claim 23, line 35, delete the formula in the second occurrence which was repeated inadvertently $$30 \quad \left( \frac{1}{\frac{\sin(x/G)}{x/G} \frac{\sin(y/G)}{y/G} \frac{\sin(z/G_z)}{z/G_z}} \right)^2$$

$$35 \quad \left( \frac{1}{\frac{\sin(x/G)}{x/G} \frac{\sin(y/G)}{y/G} \frac{\sin(z/G_z)}{z/G_z}} \right)^2$$

Column 10, claim 24, line 63, "correspond" should be --corresponds--;

UNITED STATES PATENT AND TRADEMARK OFFICE
CERTIFICATE OF CORRECTION

PATENT NO.  : 5,079,697

DATED       : January 7, 1992

INVENTOR(S) : David A. Chesler

It is certified that error appears in the above-identified patent and that said Letters Patent is hereby corrected as shown below:

Column 11, claim 28, line 30, delete the formula in the second occurrence which was repeated inadvertently and which is indicated in red by a circle;

$$\left( \frac{\sin(x/M)}{x/M} \cdot \frac{\sin(z/M_z)}{z/M_z} \right)^2$$

$$\left( \frac{\sin(x/M)}{x/M} \cdot \frac{\sin(z/M_z)}{z/M_z} \right)^2$$

Column 12, claim 30, line 10, after "distortion," add --and--;

Column 12, claim 31, line 26, after "distortion," add --and--.

Signed and Sealed this

Thirteenth Day of April, 1993

*Attest:*

STEPHEN G. KUNIN

*Attesting Officer*    Acting Commissioner of Patents and Trademarks